United States Patent [11] 3,624,141

[72] Inventor Harry B. Copelin
 Niagara Falls, N.Y.
[21] Appl. No. 706,670
[22] Filed Feb. 19, 1968
[45] Patented Nov. 30, 1971
[73] Assignee E. I. du Pont de Nemours
 Wilmington, Del.

[54] PRODUCTION OF VINYL ACETATE FROM ETHYLENE USING A LIQUID REACTION MEDIUM CONTAINING A PALLADIUM COMPOUND CATALYST
 8 Claims, No Drawings
[52] U.S. Cl. .................................................. 260/497 A,
 252/416, 252/429 R, 260/530 R, 260/604 AC
[51] Int. Cl. ......................................................... C07c 67/04
[50] Field of Search ............................................. 260/497 A

[56] References Cited
UNITED STATES PATENTS
3,346,626 10/1967 Schaeffer et al. .............. 260/497
FOREIGN PATENTS
999,551 7/1965 Great Britain ................ 260/497

Primary Examiner—Lewis Gotts
Assistant Examiner—Vivian Garner
Attorney—Amos G. Cole ABSTRACT: A method for producing vinyl acetate wherein a liquid composition consisting essentially of acetic acid, up to 20 percent water, a palladium II compound and copper and sodium or potassium salts providing acetate and chloride or bromide anions and also the anion of a strong acid whose pK is not greater than 4 is continuously cycled between a first stage where it is reacted with ethylene to produce vinyl acetate and a second stage where it is reacted with oxygen, and wherein the vinyl acetate product is separated from the liquid composition between the first and second stages.

3,624,141

PRODUCTION OF VINYL ACETATE FROM ETHYLENE USING A LIQUID REACTION MEDIUM CONTAINING A PALLADIUM COMPOUND CATALYST

BACKGROUND OF THE INVENTION

It is known (Moiseev et al., Doklady Akad. Nauk USSR 133, 377 [1960]) that vinyl acetate can be produced by reacting ethylene with acetic acid containing palladium chloride and sodium acetate. The acetic acid reaction medium preferably also contains an oxidizing agent such as a cupric salt whose purpose is to prevent reduction of the palladium salt to metallic palladium. The cupric salt which becomes reduced during use, may be reoxidized in situ for continued use by means of oxygen supplied with the ethylene to the liquid reaction medium (hereinafter called the "working medium"). Alternatively, the reduced working medium may be reoxidized or regenerated for reuse by oxidation with air or oxygen in a separate operation as described in Belgian Pat. No. 608,610 and British Pat. No. 1,003,396. These patents disclose that it is advantageous also to have present in the working medium an alkali metal salt and a metal chloride.

It is also known (British Pat. No. 964,001) that the presence of water in minor amounts in the working medium results in the coproduction of vinyl acetate and acetaldehyde. The mol ratio of vinyl acetate:acetaldehyde in the product mixture depends upon several factors but mostly upon the water content of the working medium, which ratio increases as the water content is decreased. Any or all of the acetaldehyde produced can be oxidized to acetic acid, e.g., externally of the system, by well-known methods. Since the overall cyclic process consumes 1 mol of acetic acid per mol of vinyl acetate produced, acetic acid produced from the coproduced acetaldehyde can be used to supply all or any part of the acetic acid requirements of the process. Thus, if coproduced acetaldehyde is to be used as the source of part of all of the acetic acid requirements, the amount thereof can be readily varied as desired by controlling the water content of the working medium.

Methods in which the working medium is reacted in the same reactor simultaneously with ethylene and oxygen, often referred to as "single-stage" methods, involve the explosive hazards of handling and/or reacting mixtures of ethylene and oxygen. Such hazards are completely avoided in cyclic methods in which the reactions with ethylene and oxygen are carried out separately in separate reactors, which cyclic methods are often referred to as "two-stage" methods. The two-stage methods possess other desirable features. Thus, when employing the most generally proposed working medium comprising acetic acid, a soluble palladium compound, copper acetate, sodium chloride and, optionally, sodium acetate, the yields of vinyl acetate and acetaldehyde in the first reactor are good, regeneration of the medium in the second reactor is rapid, and the working medium is relatively cheap because of the cheapness of sodium-salts. However, a major problem associated with the use of such sodium-based working medium is its poor conversion performance in the first or synthesis reactor where vinyl acetate is produced, particularly at high copper loadings of the working medium. If potassium salts are used to replace the sodium salts in such a working medium, the resulting slurry is very prone to assume the consistency of applesauce, causing frequent and highly objectionable plugging of flow lines and the still employed for removing product vinyl acetate from the working medium. If the sodium salts in such a medium are replaced by lithium salts, undesirable byproduct formation generally occurs and the rate at which the reduced medium is regenerated by reaction with oxygen declines furthermore, such lithium-based systems tend to deposited hard and difficult-to-remove deposits on equipment surfaces such as the surfaces of the still employed to remove the vinyl acetate product.

To be commercially attractive, the cyclic two-stage process must be operated at high copper loadings with high conversion of cupric copper to cuprous copper in the synthesis reactor (first stage) and high conversion of cuprous copper to cupric copper in the oxidation reactor (second stage). Such high copper loadings and high copper conversions are highly desirable, if not essential from a practical standpoint, since they permit a higher production of vinyl acetate per cycle in a given equipment with a given volume of working medium than would be possible at lower copper loadings and/or lower copper conversions. Also, a high productivity per cycle means that the working medium effluent from the synthesis reactor will contain vinyl acetate at high concentration, thus minimizing the unit cost of distilling the vinyl acetate from the working medium. Furthermore, the working medium should be one which will not cause excessive formation of undesirable byproducts, can be readily reoxidized in the second stage, and will not form unmanageable slurries at the desired slat loadings, and will not form hard and difficult-to-remove solid deposits on equipment surfaces.

The present invention is based upon the discovery that the above highly desirable process characteristics can be realized readily when the two-stage type process is operated using a working medium meeting certain composition requirements set forth below.

SUMMARY OF THE INVENTION

The invention relates to certain liquid compositions and to their use in a two-stage method for producing vinyl acetate from ethylene.

The liquid compositions consist essentially of: acetic acid, up to 20 weight percent water, a soluble palladium II compound, and salts of copper and sodium or potassium, or both sodium and potassium; which salts provide in the composition: (a) copper cations; (b) sodium or potassium, or both sodium and potassium, cations, (c) chloride or bromide, or both chloride and bromide, anions; (d) acetate anion; and (e) another anion which is the anion of an acid having a pK value not greater than 4 which liquid compositions contain the copper cations at a concentration of from 1 to 15 weight percent and, for each gram atom of copper cations: from 1 to 2 gram atoms of sodium or potassium, or both sodium and potassium, cations, from 0.5 to 1.2 gram equivalents of chloride or bromide, or both chloride and bromide anions; from 0.1 to 1 gram equivalents of said another anion, with the balance of the anion requirements of said salts consisting essentially of the acetate anion.

The method of the invention involves continuously cycling such a liquid composition between a first reactor in which it is reacted with ethylene to produce vinyl acetate, and a second reactor in which it is reacted with oxygen before being recycled to the first reactor, with the product vinyl acetate being removed from the liquid composition between the first and second reactors in the cycle.

DETAILED DESCRIPTION AND PREFERRED EMBODIMENTS

The reaction in the first reactor of the cycle between ethylene and the working medium to product vinyl acetate is generally regarded as one involving ethylene and the acetate anion of a metal acetate such as cupric acetate or sodium acetate. The reaction probably occurs through the intermediate formation of an ethylene-palladium salt complex, e.g., $(C_2H_4 \cdot PdCl_2)_2$. In practical application, the presence of chloride and/or bromide anions is generally considered necessary in order to achieve practical rates. When using a cupric salt such as cupric acetate as the oxidizing agent and also as a source of the acetate anions, the cuprous cations formed during the reaction cause precipitation of cuprous chloride or bromide and, therefore, removal of soluble chloride or bromide anions. Accordingly, sufficient of such anions should be present so that not all will be precipitated as the insoluble cuprous halide.

In practical applications, the presence of an alkali metal cation is highly desirable, if not essential, since if only copper salts are present along with the palladium II catalyst, the rate at which the working medium is regenerated by reaction with oxygen is extremely slow and the rate at which the medium reacts with ethylene to produce vinyl acetate is low.

Thus, in practical applications, the acetic acid working medium will advantageously contain a palladium compound catalyst, copper and alkali metal cations, and acetate and chloride or bromide anions. The following equations illustrate the reactions involved when starting with cupric acetate as the original source of both copper cations and acetate anions, and using sodium chloride as the original source of both alkali metal cations and chloride anions. In the equations, acetate anions or the acetate group, i.e., $OCCH_3$, are represented simply by "Ac," and vinyl acetate is designated simply as VAc. The reaction to produce vinyl acetate is indicated by equation A:

A. $C_2H_4 + 2Cu(OAc)_2 \rightarrow VAc + 2CuOAc + HOAc$

The cuprous acetate product of the above reaction is converted to cuprous chloride according to the following equation:

B. $2CuOAc + 2NaCl \rightarrow 2CuCl + 2NaOAc$

The summation of reactions A and B is represented by equation C:

C. $C_2H_4 + 2Cu(OAc)_2 + 2NaCl \rightarrow VAc + 2CuCl + 2NaOAc + HOAc$ from which it will be seen that the copper is removed from the solution in the form of insoluble cuprous chloride and the sodium chloride is converted to sodium acetate. Because sodium acetate is relatively highly ionized, it provides a relatively high acetate anion concentration in the reduced medium.

The above reactions are the chief reactions which occur in the first or synthesis reactor of the cycle. The reaction which occurs in the second or oxidation reaction of the cycle involves the reoxidation of the cuprous salt formed in the first reactor. It may be represented by equation D:

D. $2CuCl + 2NaOAc + 2HOAc + \frac{1}{2}O_2 \rightarrow 2Cu(OAc)_2 + 2NaCl + H_2O$ The net or overall reaction for the cyclic process may be represented by equation E, which is a summation of equations C and D:

E. $C_2H_4 + HOAc + \frac{1}{2}O_2 \rightarrow VAc + H_2O$

It will be seen from equation E that 1 mol of acetic acid (HOAc) is consumed and 1 mol of water is formed for each mol of vinyl acetate (VAc) produced in the cycle.

Whereas the presence of acetate anions in the working medium is both desirable and essential for the reaction which produces vinyl acetate to proceed, it has now been discovered, quite surprisingly, that too high a concentration of acetate anions results in poor conversions of ethylene to vinyl acetate, particularly at high copper loadings of the working medium. Since high copper loadings are highly desirable in order to provide high synthesis capacity per cycle, the problem is presented as to how to obtain such high copper loadings in a practical way without obtaining undesirably high concentrations of acetate anions.

The invention is based upon the discovery that high copper loadings may be achieved without unduly increasing the acetate anion concentration by having present in the working medium copper cations at a high loading along with alkali metal cations, chloride (or bromide) anions, acetate anions and a third type of anions, all in controlled proportions with reference to the copper cations. The third type of anions should be that of an acid which is stronger than acetic acid, an example of which is sulfuric acid. High copper loadings can be achieved by supplying part of the copper requirements as cupric sulfate, thus permitting substantially lower acetate anion concentrations, as indicated by equation F:

F. $C_2H_4 + 1\frac{1}{2}Cu(OAc)_2 + \frac{1}{2}CuSO_4 + 2NaCl \rightarrow VAc + 2CuCl + \frac{1}{2}Na_2SO_4 + NaOAc + HOAc$ By comparing equation F with equation C, it will be seen that the same copper loadings at the same sodium cation and chloride anion concentrations may be obtained but with a reduction of 50 percent in the acetate anion concentration in the reduced medium by supplying one-fourth of the original copper as cupric sulfate rather than all as cupric acetate.

While the above 50 percent reduction in acetate anion concentration has reference to the reduced solution, such reduction is significant since the obtainment of high synthesis capacity per cycle requires not only a high copper loading, but also operation of the first or synthesis reactor at a high copper conversion level, i.e., a high level of the conversion of the copper from the cupric to the cuprous state. As a practical matter, the copper conversion level in the first reactor should generally be at least 70 percent, i.e., 70–99 percent of the copper present in the effluent from that reactor should be in the cuprous state, the preferred conversion level being 85 to 95 percent. The reaction in the first reactor should be effected under constant environment conditions which are readily achieved by employing efficient back-mixing therein so that the compositions of the working medium in that reactor will be essentially constant throughout the reactor and will be the same as the composition of the effluent. In contrast, however, the composition of the working medium feed to that reactor will be quite different in that substantially all of the copper will be present as cupric copper. Since most of the copper actually present in the first reactor will, therefore, be cuprous copper, the significance of the above 50 percent reduction of the acetate anion concentration in the reduced state, achieved by supplying one-fourth of the original copper as cupric sulfate, becomes readily apparent.

The inhibiting effect of excess acetate anion on the synthesis reaction of the cycle can be demonstrated by a simple test designed to simulate the continuous reaction in a simple batch equipment. In this test, an autoclave provided with an efficient agitator is charged with 0.5 g. palladium black, 300 g., acetic acid, 100 g. cupric acetate monohydrate and an amount of sodium acetate to be tested. In a series of tests carried out, each under the same conditions and with the same charge except that the amounts of sodium acetate were varied in each, the extent to which the copper was converted from the cupric state to the cuprous state was measured as an indication of the effectiveness of the synthesis charge in producing vinyl acetate and acetaldehyde. Actually, the conversion of cupric to cuprous copper in this reaction correlates very well with the production of vinyl acetate and acetaldehyde, such production generally being equal to around 95 to 98 percent of that represented by the copper conversion. In each of the tests, the original charge consisting of the palladium black, acetic acid, cupric acetate and sodium acetate, after sealing the unit, heating to 110° C. and pressurizing with ethylene, remained unreactive. At that point, a solution composed of 20 g. HCl, 35 g. $H_2O$ and 100 g. acetic acid was pumped into the autoclave over a period of about 10 minutes. The reaction began shortly after the latter addition began. After a few minutes cleanup time, the reaction mixture was sampled and the copper conversion determined. The amount of hydrogen chloride pumped in to initiate the reaction in each case corresponded to 1.1 mols of chloride anion per mol of cupric acetate in the charge. The amount of sodium acetate in the charge was varied to provide the mol ratio of sodium to cupric acetate indicated in table I.

TABLE I

| Mol Ratio NaOAc:Cu(OAc)$_2$: | Mols NaOAc Per Liter* | % Copper Conversion Cupric to Cuprous) |
|---|---|---|
| 0.2 | 0.23 | 100 |
| 0.4 | 0.44 | 100 |
| 0.6 | 0.66 | 100 |
| 0.8 | 0.87 | 95 |
| 1.0 | 1.07 | 83 |
| 2.0 | 2.03 | 30 |
| 3.0 | 2.89 | 7 |

*In the completely reduced medium, i.e., all copper in the cuprous state.

It will be readily apparent from the above data that the copper conversion and, therefore, the reaction to produce vinyl acetate and acetaldehyde, begins to decrease as the mol ratio of sodium acetate to cupric acetate exceeds about 0.6 and drops off rapidly as the ratio exceeds about 1.0, the conversion being almost insignificant when the mol ratio equals about 3.

Similar test data for charges containing potassium acetate or lithium acetate in place of sodium acetate are shown in tables IA and IB.

TABLE IA

| Mol Ratio KOAc:Cu(OAc)₂ | Mols KOAc Per Liter* | % Copper Conversion (Cupric to Cuprous) |
|---|---|---|
| 0.2 | 0.23 | 99.6 |
| 1.0 | 1.07 | 99.0** |
| 3.0 | 2.87 | 21.9 |

*In completely reduced medium, i.e., all copper in the cuprous state.

**This system gave a slurry resembling applesauce which would be unmanageable in the cyclic system.

TABLE IB

| Mol Ratio LiOAc:Cu(OAc)₂ | Mols LiOAC Per Liter* | % Copper Conversion (Cupric to Cuprous) |
|---|---|---|
| 0.2 | 0.23 | 100.0 |
| 1.0 | 1.08 | 100.0 |
| 2.0 | 2.04 | 100.0 |
| 3.0 | 2.92 | 100.0 |
| 4.0 | 3.70 | 89.4 |

*In completely reduced medium, i.e., all copper in the cuprous state.

The optimum acetate anion concentration in the working solution, as indicated previously, will vary will the copper loading.

For the sodium acetate-based systems represented by the data of table I, the approximate actual sodium acetate concentrations, calculated on the basis of the completely reduced working medium and at optimum mol ratio of copper cations: chloride anions of 1:1 and at a mol ratio of copper to sodium of 1:1.2, are shown in table II below for various copper loadings.

TABLE II

| Wt. % Cu | Mols/Liter NaOAc In Reduced Medium |
|---|---|
| 5.0 | 1.27 |
| 7.2 | 1.95 |
| 9.2 | 2.68 |
| 11.0 | 3.47 |

It will be apparent from equation F that by varying the relative proportions of cupric acetate and cupric sulfate in the oxidized working medium, the concentration of acetate anion in the reduced medium can be varied over a wide range. If equal mol proportions of cupric acetate and cupric sulfate are changed, no acetate anion would be present in the completely reduced medium, as indicated by equation G:

G. $C_2H_4 + Cu(OAc)_2 + CuSO_4 + 2NaCl \rightarrow VAc + HOAc + 2CuCl + Na_2SO_{4b}$ The absence of acetate anion in the reduced solution is undesirable since a small concentration thereof, generally in the range of about 0.1 to about 1 mol per liter, is desirable and necessary for the obtainment of high reaction rates and yields of vinyl acetate. It has been found that the optimum mol ratio of copper acetate to the other copper salt such as copper sulfate in the oxidized working medium will vary considerably with the copper loading. Thus, if it be assumed that the optimum concentration of acetate anion in the reduced medium is 0.5 molar, then the required mol ratios of copper acetate to copper sulfate in the oxidized media at various copper loadings to give that acetate anion concentration in the reduced media are indicated by the following table:

TABLE III

| Wt. % Cu | Mol Ratio: Cu(OAc)₂/CuSO₄ |
|---|---|
| 5.0 | 2.80 |
| 7.2 | 1.86 |
| 9.2 | 1.61 |
| 11.0 | 1.40 |

As indicated previously, the working liquid compositions which constitute the working media employed in the method of the invention will consist essentially of acetic acid, up to 20 weight percent water, palladium II compound (catalyst) and copper and sodium and/or potassium salts, which salts will provide in the medium copper and sodium and/or potassium cations, and acetate and chloride or bromide anions and also the anion of a strong acid such as sulfuric acid. More particularly, the copper and sodium or potassium salts contents of the composition used as the working medium should be such as to provide in the composition 1–15 weight percent of copper cations, 1–2 gram atoms of sodium and/or potassium cations per gram of copper cations, 0.5–1.2 gram equivalents of chloride and/or bromide anion per gram atom of copper cations, 0.1–1 gram equivalent of the anion of a strong acid such as sulfuric acid per gram atom of copper cations, with the balance of the anion requirements of said copper and sodium and/or potassium salts consisting essentially of the acetate anion. Preferably, the copper and sodium or potassium salts will provide a copper cation content of 5–11 weight percent, from 1.1–1.5 gram atoms of sodium and/or potassium per gram atom of copper cations, 0.7–1.1 gram equivalents of chloride and/or bromide anions per gram atom of copper cations, and 0.2–0.8 gram equivalents of the anion of a strong acid such as sulfuric acid per gram atom of copper cations.

The strength of an acid is generally indicated by its pK value which is a measure of acid strength referred to a dilute water solution at 25° C. and is mathematically the log of the reciprocal of the ionization constant of the acid. Thus, the lower the pK value, the stronger the acid. The pK value for acetic acid is 4.75. Generally, an acid should have a pK value not greater than about 4.0 in order for its anion to be usable in accordance with the invention. Such acids are herein referred to as strong acids or as acids that are stronger than acetic acid. Of course, not all acids having pK values of 4 or less are usable. Hydrochloric acid and hydrobromic acid are examples of acids whose anions are not generally suitable, since such anions, if added to replace acetate anions, would cause an excessive concentration of halide ions. The anions of ortho- and pyrophosphoric acids, and also oxalic acid, should generally not be used since they react with various other active components of the working medium to form very insoluble compounds. Examples of acids whose anions are usable are chloroacetic and dichloroacetic acids, benzene and methane sulfonic acids, sulfuric acid and tetraboric acid. Others include o-chlorobenzoic and o-nitrobenzoic acids; malonic acid; alpha-chloropropionic and alpha-chlorobutyric acids; cyanoacetic and nitroacetic acids; and mono-, di- and trifluoroacetic acids. Anions of still other strong acids can also be employed providing that such anions do not adversely react with any of the active components of the working medium. The sulfate anion is most preferred.

The anion of the acid stronger than acetic acid can be incorporated into the working medium by adding it in the form of an alkali metal or a copper salt. Alternatively, it can be formed in situ by the reaction of an alkali metal acetate or cupric acetate with the strong acid which is added as such. Thus, sulfuric acid will react with sodium acetate in the medium to produce sodium sulfate and acetic acid. The other anion requirements of the working medium i.e., the chloride and acetate anions, can be added as alkali metal or copper salts as desired, so long as the ionic ratios indicated above result.

As indicated previously, the anion of the acid stronger than acetic acid should be present in the working medium in the amount to provide from 0.1 to 1 gram equivalents thereof per gram atom of copper cations present; preferably, from 0.2 to 0.8 gram equivalents of such anion will be present per gram atom of copper cation and such anion will most preferably be the sulfate anion.

Although the method of the invention is described herein with particular reference to the production of vinyl acetate, it will be understood that depending upon such factors as the water content of the working medium and the ethylene pressure under which the reaction in the first reactor is carried out, the method can also be practiced to produce substantial quantities of acetaldehyde. In a preferred embodiment, the method is practiced to produce vinyl acetate together with substantial amounts of acetaldehyde, e.g., in nearly equal molar amounts with the vinyl acetate, thereby providing acetaldehyde for oxidation to acetic acid for use in supplying the acetic acid requirements of the process. The proportions of acetaldehyde coproduct obtained will vary depending primarily upon the water content of the working medium, the higher the water content the greater the proportion of acetaldehyde. In general, water contents up to about 20 percent may be employed. If it is desired to keep the production of acetaldehyde at a minimum, water contents as low as possible should be employed. When coproduction of substantial amounts of acetaldehyde is desired, e.g., for use as precursor for the acetic acid requirements of the process, water contents ranging from around 3 to 12 percent are preferably employed, although higher concentrations of up to 20 percent are usable. Since water is continuously formed in the cyclic process during the oxidation of the reduced working medium in the second reactor, it must be removed at some stage in the cycle in order to maintain a constant water level in the synthesis or first reactor. Water may be removed from the medium between the second and first reactors, however, it is generally most conveniently removed along with the vinyl acetate and acetaldehyde products from the effluent working medium from the first reactor. Thus, when such effluent is passed to a stripping still to remove the vinyl acetate and acetaldehyde, water will also be removed. Generally, the amount of water removed at this stage of the cycle will be sufficient to maintain the desired water content in the first stage reactor, particularly when the coproduction of vinyl acetate and acetaldehyde is desired.

The catalyst component of the working medium may be any soluble palladium II compound, examples of which are palladous chloride, palladous bromide, palladous acetate and the alkali metal chloro- and bromopalladites. The palladium compound may be charged to the medium as one or more of such salts; or palladium metal, e.g., in the form of palladium black, its oxide or carbonate may be charged and dissolved in the working medium. The palladium compound catalyst should generally be present in the medium at a concentration of at least 0.0001 molar, e.g., 0.0001 to 0.1 molar or higher, the preferred concentrations generally ranging from 0.001 to 0.05 molar. The synthesis reaction will generally be carried out at temperatures up to 150° C., e.g., 50° to 150° C., and preferably 90° to 130° C. It will generally be advantageous to operate at ethylene pressures greater than atmospheric and pressures of 100 to 2000 p.s.i.g. are generally usable. The preferred ethylene pressures range from around 100 to 300 p.s.i.g. Depending upon such factors as the catalyst concentration and the reaction temperature and pressures, the contact time in the constant environment first reactor may be as low as 1 minute or a fraction of a minute, but usually will range from around 5 to 10 minutes. High contact times, e.g., up to 20 minutes or more, can be used but are not necessary.

When operating the first reactor under constant environment conditions at high copper conversion levels, a good part of the chloride and/or bromide anions will be present as precipitated cuprous halide. It is important, therefore, that sufficient halide anions (chloride and/or bromide anions) be provided in the working medium so that not all will be precipitated as the cuprous halide in the synthesis reactor. Thus, sufficient halides should be charged to the system to provide a dissolved halide concentration of from 0.01 to 0.5 molar, preferably 0.03 to 0.3 molar, in addition to the halide ions that will be in precipitated form as cuprous halide in the first stage reactor. Higher concentrations of dissolved halide anion at this stage are undesirable since they cause excessive formation of byproducts.

The effluent working medium from the first reactor will generally be passed to a stripping still for removing vinyl acetate and acetaldehyde product along with byproduct water, and the stripped working medium effluent from the still will then be passed to the second reactor for reoxidation by reaction with air, oxygen or oxygen-enriched air. The reoxidation may be carried out in any conventional reactor or oxidation tower, provision being made to keep the working medium agitated to insure suspension of the solids therein and to provide good contact with the gaseous reactant. The reaction usually will be effected at temperatures of at least 50° C., e.g., 50° to 150° C. or higher to insure the desired reaction rate. The preferred temperatures range from about 80° to 130° C. Oxygen partial pressures of from 0.01 to 2 atmospheres are generally suitable, the preferred oxygen partial pressures ranging from 0.1 to 1 atmospheres. The reoxidized working medium effluent from the second reactor is then recycled to the first reactor for reaction with further amounts of ethylene. Fresh acetic acid to compensate for that consumed in the cycle is conveniently fed to the working medium stream being recycled to the first reactor.

The principles and the practice of the method of the invention are illustrated by the following examples in which all composition percentages and parts are by weight.

EXAMPLE 1 a. A 1-liter titanium lined autoclave provided with an efficient agitator was charged with 100 g. (0.5 mol) of cupric acetate monohydrate, 300 g. of glacial acetic acid, 82 g. (1 mol) of anhydrous sodium acetate and 0.5 g. of palladium black. The autoclave was sealed, heated to 110° C. and pressurized with ethylene to 200 p.s.i.g. No reaction occurred until a solution containing 20 g. HCl in 35 g. $H_2O$ and 100 g. acetic acid was pumped in at an even rate over a 10-minute period. Thereafter, the temperature was maintained at 110° C. and the pressure at 200 to 230 p.s.i.g., while the reaction proceeded for 5 minutes, following which the working medium was sampled and analyzed. The copper conversion, i.e., the conversion of cupric copper to cuprous copper, was 30 percent, which conversion represents an approximation of the capacity of the medium to produce vinyl acetate and acetaldehyde per cycle in a cyclic operation.

b. When the above test was repeated except that the 82 g. of sodium acetate were replaced by only 16.4 g. (0.2 mol) of sodium acetate together with 57 g. (0.4 mol, 0.8 acetate equivalent) of sodium sulfate, the copper conversion was 100 percent.

EXAMPLE 2

The test of example 1(a) was repeated except that 75.6 g. (0.8 mol) of monochloroacetic acid was also added to the autoclave with the initial charge. The resulting copper conversion was 95 percent.

EXAMPLE 3

When the test of example 1(a) was repeated except that 103 g. (0.8 mol) of dichloroacetic acid was added to the autoclave with the initial charge, the copper conversion was 100 percent.

EXAMPLE 4

When the test of example 1(a) was repeated except that 77 g. (0.8 mol) of methane sulfonic acid was added to the autoclave with the initial charge, the copper conversion was 96.2 percent.

EXAMPLE 5

When the test of example 1(a) was repeated except that 24.6 g. (0.3 mol) of sodium acetate, together with 54 g. (1.3 mol) of sodium benzene sulfonate, were added in place of the 82 g. of sodium acetate, the copper conversion was 97.3 percent.

EXAMPLE 6

The test of example 1(a) was repeated except that 250 g. of acetic acid, instead of 300 g., was charged to the autoclave and 91 g. (0.8 mol) of trifluoroacetic acid was added in addition to the other materials indicated in example 1(a). The copper conversion obtained was 96.9 percent.

EXAMPLE 7

The test of example 1(a) was repeated except that 280 g. of acetic acid, 42 g. (0.51 mol) of sodium acetate and 71 g. (0.5 mol, 1 acetate equivalent) of sodium sulfate were added instead of the 300 g. of acetic acid and 82 g. of sodium acetate. The copper conversion was 89 percent.

EXAMPLE 8 a. The autoclave used in example 1(a) was charged with 100 g. (0.5 mol) of cupric acetate monohydrate, 280 g. of glacial acetic acid, 20 g. of water, 0.5 g. of palladium black and 82 g. (1 mol) of sodium acetate. After sealing the autoclave, heating it to 110° C. and pressurizing it to 235 p.s.i.g. with ethylene, a solution containing 90 g. acetic acid, 10 g. $H_2O$ and 24 g. (0.57 mol) of lithium chloride was pumped in over a 10-minute period. During the addition, the temperature was maintained at 110° C. and the ethylene pressure at 200–247 p.s.i.g. After 5 additional minutes, the mixture in the autoclave was sampled and analyzed. The copper conversion was found to be 29.9 percent.

b. When the above test was repeated except that 71 g. (0.5 mol, 1 acetate equivalent) of sodium sulfate was charged instead of the 82 g. of sodium acetate, the conversion obtained was 99.4 percent.

c. When the test was again repeated except that 100.6 g. (0.5 mol, 1 acetate equivalent) of anhydrous sodium tetraborate, $Na_2B_4O_7$, was charged in place of the 82 g. of sodium acetate, the conversion was 76.7 percent.

In the following examples, a series of "loop tests" were carried out in continuous cyclic operations. In this test, a working medium was reacted with ethylene in an efficient back-mixing synthesis reactor to produce vinyl acetate and acetaldehyde products and reduced working medium, which products and excess water were stripped from the reduced medium in a distillation column, and the stripped reduced medium was reoxidized by reaction with air in a second column. The reoxidized medium was then recycled to the synthesis reactor after the addition thereto of makeup acetic acid to maintain a constant volume. The equipment was so arranged that a continuous and steady flow of the working medium passed through the various pieces of equipment which were arranged in the form of a loop. In carrying out the tests, a batch of 450–500 parts of the test working medium was prepared in a batch kettle from which it was pumped slowly into the loop which had been initially filled with acetic acid. As the medium entered the loop, corresponding amounts of acetic acid were removed by the still so as to maintain a constant volume of material in the loop. In all of the tests in the following examples, both vinyl acetate and acetaldehyde were produced, the mol ratio of vinyl acetate to acetaldehyde in the products varying from about 0.7:1 to 1.5:1. Based upon the amount of copper actually converted from the cupric to the cuprous state in the synthesis reactor, the combined amounts of vinyl acetate and acetaldehyde produced corresponded to yields of about 95 percent.

EXAMPLE 9 a. The batch kettle was charged with the following:

|  | Parts |
| --- | --- |
| Cupric acetate monohydrate | 122 |
| Sodium acetate | 10 |
| Sodium chloride | 35.8 |
| $PdCl_2$ solution (22% $PdCl_2$, 62% $H_2O$, 16% HCl) | 0.69 |
| Glacial acetic acid | 283 |
| Water | 40 |

The above charge corresponded to a copper loading of 8 percent, a water loading of 10 percent and mol ratios of Cl:OAc:Na:Cu of 1:2.2:1.2:1. The temperature in the synthesis vessel was 115° C. and in the oxidizing column it was 130° C. The ethylene pressure was maintained at 185 p.s.i.g. in the synthesis reactor and the air pressure in the oxidizing column was maintained at 95 p.s.i.g. The circulation rate of the working medium in the loop was 1000 parts/hour. Under these conditions the copper loading of 8 percent was attained, showing that copper values had not been removed by deposition on equipment surfaces. Analyses of the synthesis vessel and oxidizing column effluents showed their copper conversion levels to be 50 percent and 95 percent, respectively. These values mean that 50 percent of the copper in the synthesis vessel effluent was in the cuprous state, while 95 percent of the copper in the oxidizing column effluent was in the cupric state.

b. The above test was essentially repeated except that the batch kettle was charged with:

|  | Parts |
| --- | --- |
| Cupric acetate monohydrate | 107 |
| Sodium chloride | 6.4 |
| Sodium sulfate | 30.4 |
| 37% aqueous HCl | 41.4 |
| $PdCl_2$ solution (22% $PdCl_2$, 62% $H_2O$, 16% HC.) | 0.67 |
| Ammonium vanadate | 0.33 |
| Water | 9 |
| Acetic acid | 327 |

The above charge corresponded to a copper loading of 8 percent, a water loading of 6 percent and mol ratios of Cl:OAc:SO$_4$:Na:Cu of 1:1.2:0.4:1:1. Under the temperature and pressure conditions indicated in test (a) and equilibrium conditions obtained at a circulation rate of 1000 parts/hour, the synthesis reactor conversion was 80 percent and the oxidizing column conversion was 85 percent. The greatly improved synthesis vessel conversion achieved, as compared with that obtained in test (a), imposed a greatly increased load on the oxidizing column which accounts for the somewhat lower copper conversion level obtained for the effluent from the latter unit.

EXAMPLE 10 a. The batch kettle was charged with the following:

|  | Parts |
| --- | --- |
| Cupric acetate monohydrate | 16.75 |
| Cupric oxide | 31.5 |
| Potassium chloride | 35.5 |
| Potassium acetate | 9.5 |
| Water | 27.0 |
| $PdCl_2$ solution (22% $PdCl_2$, 62% $H_2O$, 16% HCl) | 0.225 |
| Ammonium vanadate | 0.225 |
| Glacial acetic acid | 339 |

The above charge corresponded to a copper loading of 6.8 percent, a water loading of 8 percent, and a mol ratio of CL:OAc:K:Cu of 1:2.2:1.2:1. The temperature in the synthesis vessel was 110° to 114° C., and in the oxidizing column, 122° C. The ethylene pressure in the synthesis reactor was 185 p.s.i.g. and the air pressure in the oxidizing column was 100 p.s.i.g. The circulation rate was 1250 parts/hour. This system was found to be very difficult to operate due to slurry plugging in the lines and in the stripping still. Because of such plugging, it was impossible to attain a copper level in the recycle medium greater than 4 percent. Also, as a result of such plugging, the copper conversion level in the synthesis vessel fluctuated from 50 to 80 percent. The copper conversion level in the oxidizing column was about 90 percent.

b. The above test (a) was essentially repeated except that the batch kettle was charged with the following:

|  | Parts |
|---|---|
| Cupric acetate monohydrate | 107 |
| Potassium sulfate | 46.6 |
| Potassium chloride | 8.0 |
| 37% aqueous HCl | 41.7 |
| Water | 13 |
| PdCl$_2$ solution (22% PdCl$_2$, 62% H$_2$O, 16% HCl) | 0.67 |
| Ammonium vanadate | 0.33 |
| Glacial acetic acid | 270 |

The above charge corresponded to a copper loading of 7 percent and mol ratios of Cl:OAc:SO$_4$:K:Cu of 1:1.2:0.5:1.2:1. The temperatures in the synthesis vessel and the oxidizing column, respectively, were 115° C. and 135° C. The ethylene and air pressures, respectively, were 195 p.s.i.g. and 95 p.s.i.g. The circulation rate was 1000 parts/hour. Under these conditions and with operation at a water loading of 12–15 percent, this charge gave smooth operation with attainment of the full copper loading of 7 percent. No slurry plugging difficulty was encountered and the copper conversions in the synthesis reactor and the oxidizing column, respectively, were 85–95 percent and 90 percent.

EXAMPLE 11

The batch kettle was charged with the following:

|  | Parts |
|---|---|
| Cupric acetate monohydrate | 141.2 |
| Potassium sulfate | 49.5 |
| Potassium chloride | 21.2 |
| 37% aqueous HCl | 42.0 |
| PdCl$_2$ solution (22% PdCl$_2$, 62% H$_2$O, 16% HCl) | 1 |
| Ammonium vanadate | 0.61 |
| Glacial acetic acid | 335 |

The above charge corresponded to a copper loading of 9 percent, a water loading of 10 percent and mol ratios of Cl:OAc:SO$_4$:K:Cu of 1:1.4:0.4:1.2:1. The temperatures in the synthesis reactor and the oxidizing column, respectively, were 195 p.s.i.g. and 90 p.s.i.g. The circulation rate was 800 parts/hour. Under these conditions, the system operated smoothly at essentially the full copper loading with little tendency to plugging. The copper conversion levels in the synthesis reactor and in the oxidizing column, respectively, were 90 percent and 95 percent.

The productivity of vinyl acetate and acetaldehyde in any given size reaction loop of the above type depends upon the copper loading of the working medium, the circulation rate of the medium in the loop and the net copper conversion across the loop. If the copper conversion in the oxidizing column is 80 percent and the copper conversion in the synthesis vessel is also 80 percent, the effluent from the oxidizing column would contain 20 percent of the copper in the reduced form whereas the effluent from the synthesis vessel would contain 80 percent of the copper in the reduced form. Thus, the net conversion of copper from the oxidized form to the reduced form would be 80 percent minus 20 percent, or 60 percent, which would be the net copper conversion across the loop. At such a net copper conversion, the productivity of the system, in terms of the number of pounds of copper reduced per hour, is given by multiplying the percent copper loading of the system by 0.60, and multiplying that result by the circulation rate.

Table IV summarizes the data reported in examples 9 through 11.

It will be seen from the above data that the net conversions in examples 9(b) and 10(b) were substantially greater than those obtained under generally similar conditions in examples

TABLE IV

| Example | Alkali-metal cation | Sulphate | Clr. rate, pts./hr. | Cu loading percent | Net conv., percent | Productivity, lbs. cu./hr. |
|---|---|---|---|---|---|---|
| 9(a) | Na | No | 1,000 | 7 | 45 | 32 |
| 9(b) | Na | Yes | 1,000 | 8 | 65 | 52 |
| 10(a) | K | No | 1,250 | 4 | 40 | 20 |
| 10(b) | K | Yes | 1,000 | 7 | 80 | 56 |
| 11 | K | Yes | 800 | 9 | 85 | 61 |

9(a) and 10(a), respectively. It will also be seen that the productivities in examples 9(b) and 10(b) were much higher than those for examples 9(a) and 10(a), respectively. The above data clearly demonstrate the effectiveness of replacing part of the acetate anions with sulfate anions in accordance with the invention in improving the productivity in cyclic operations employing either a sodium-based or a potassium-based working medium. Such partial replacement of acetate by sulfate anions also decreases markedly deposition of solids on equipment surfaces, particularly in the potassium-based type working medium, as shown in example 10. Furthermore, in such potassium-based systems, the cuprous chloride precipitate present in the system appears to be formed in a much more mobile slurry form than is the case when no replacement of acetate anions by sulfate anions has been made so that the slurry working medium is much more easily handled in moving it through the loop.

I claim:

1. In a cyclic process for producing vinyl acetate from ethylene wherein a liquid working medium comprising acetic acid, a palladium II compound, a metal acetate, a copper compound and a metal chloride or bromide is cycled continuously between a first reactor (A) in which it is reacted with ethylene to produce vinyl acetate and partially reduced working medium, and a second reactor (B) in which the reduced medium is reoxidized by reaction with oxygen before being recycled to reactor (A), and wherein vinyl acetate product is removed from said working medium between reactors (A) and (B), the improvement comprising employing as said liquid working medium one consisting essentially of acetic acid, up to 20 weight percent water, a soluble palladium II compound and salts of copper and sodium or potassium, or both sodium and potassium; which salts provide in said medium:

a. copper cations;
b. sodium or potassium, or both sodium and potassium cations;
c. halide anions which are chloride or bromide, or both chloride and bromide, anions;
d. acetate anion; and
e. another anion which is the anion of an acid having a pK value not greater than 4, said acid being from the group consisting of chloroacetic acid, dichloroacetic acid, benzene sulfonic acid, methane sulfonic acid, sulfuric acid, tetraboric acid, o-chlorobenzoic acid, o-nitrobenzoic acid, malonic acid, alpha-chloropropionic acid, alpha-chlorobutyric acids, cyanoacetic acid, nitroacetic acid, and mono-, di- and trifluoroacetic acids;

said medium containing said copper cations at a concentration of from 1–15 weight percent and, for each gram atom of copper cation: from 1–2 gram atoms of sodium or potassium, or both sodium and potassium, cations; from 0.5–1.2 gram equivalents of halide anions; from 0.1–1 gram equivalents of said another anion, with the balance of the anion requirements of said salts consisting essentially of said acetate anion.

2. The process of claim 1 wherein ethylene is reacted with the liquid working medium in reactor (A) under efficient back-mixing conditions and with from 70 to 99 percent of the copper in the liquid working medium in said reactor (A) being in the cuprous state.

3. The process of claim 2 wherein the halide anions are chloride anions, the water content of the liquid working medium is 3 to 12 weight percent and the copper cation content of said medium is 5–11 weight percent and there are present for each gram atom of copper cation: from 1.1–1.5 gram atoms of sodium or potassium, or both sodium and potassium cations; from 0.7–1.1 gram equivalents of halide anions; and from 0.2–0.8 gram equivalents of said another anion.

4. The process of claim 2 wherein the said another anion is the sulfate anion.

5. The method of claim 2 wherein the salts are copper and sodium salts and the halide anions are chloride anions.

6. The method of claim 2 wherein the salts are copper and potassium salts and the halide anions are chloride anions.

7. The method of claim 2 wherein the salts are copper and sodium salts and the said another anion is the sulfate anion.

8. The method of claim 2 wherein the salts are copper and potassium salts and the said another anion is the sulfate anion.

* * * * *